(12) United States Patent
Kobayashi

(10) Patent No.: US 12,104,064 B2
(45) Date of Patent: Oct. 1, 2024

(54) ACTIVE ENERGY CURABLE WHITE INK COMPOSITION, PRINTING METHOD, PRINTING DEVICE, AND PRINTED MATTER

(71) Applicant: Hiroki Kobayashi, Kanagawa (JP)

(72) Inventor: Hiroki Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 906 days.

(21) Appl. No.: 17/172,139

(22) Filed: Feb. 10, 2021

(65) Prior Publication Data

US 2021/0246321 A1 Aug. 12, 2021

(30) Foreign Application Priority Data

Feb. 12, 2020 (JP) .................................. 2020-021668
Jan. 13, 2021 (JP) .................................. 2021-003424

(51) Int. Cl.
*C09D 11/00* (2014.01)
*B41J 11/00* (2006.01)
*C08F 220/18* (2006.01)
*C08F 220/28* (2006.01)
*C08F 220/30* (2006.01)
(Continued)

(52) U.S. Cl.
CPC ....... *C09D 11/101* (2013.01); *B41J 11/00214* (2021.01); *C08F 220/1806* (2020.02); *C08F 220/1811* (2020.02); *C08F 220/281* (2020.02); *C08F 220/282* (2020.02); *C08F 220/301* (2020.02); *C08F 220/58* (2013.01); *C08F 222/102* (2020.02); *C08F 222/1061* (2020.02); *C08F 226/06* (2013.01);
(Continued)

(58) Field of Classification Search
CPC ... C09D 11/101; C09D 11/037; C09D 11/107; C09D 11/008; C08F 220/1806; C08F 220/281; C08F 222/1061; C08F 222/102; C08F 220/301; C08F 220/1811; C08F 220/58; C08F 226/06; B41J 11/00214; C08K 5/5397
USPC ....................... 106/31.01, 31.13, 31.6, 31.76
See application file for complete search history.

(56) References Cited

U.S. PATENT DOCUMENTS

2017/0260405 A1* 9/2017 Kumai ................. C09D 11/102
2018/0208783 A1* 7/2018 Takahashi .............. C09D 11/54
(Continued)

FOREIGN PATENT DOCUMENTS

JP 2011-207960 10/2011
JP 2012-140491 7/2012
(Continued)

*Primary Examiner* — James E McDonough
(74) *Attorney, Agent, or Firm* — Grüneberg and Myers PLLC

(57) ABSTRACT

An active energy curable white ink composition contains a nitrogen atom-containing monofunctional monomer (A), a nitrogen atom-free monofunctional monomer (B) having a glass transition temperature of 15 degrees or higher, a polyfunctional monomer (C), a polymerizable oligomer (D), an acylphosphine oxide-based polymerization initiator (E), and a white pigment (F), wherein the proportion of (D) in the active energy curable white ink composition is 0.2% by mass or less, the proportion of (E) in the active energy curable white ink composition is from 6% to 10% by mass, and the proportion of (F) in the active energy curable white ink composition is from 12% to 17% by mass.

12 Claims, 2 Drawing Sheets

(51) Int. Cl.
  *C08F 220/58*  (2006.01)
  *C08F 222/10*  (2006.01)
  *C08F 226/06*  (2006.01)
  *C08K 5/5397*  (2006.01)
  *C09D 11/037*  (2014.01)
  *C09D 11/101*  (2014.01)
  *C09D 11/107*  (2014.01)
  *C09D 17/00*  (2006.01)

(52) U.S. Cl.
  CPC .......... *C08K 5/5397* (2013.01); *C09D 11/037* (2013.01); *C09D 11/107* (2013.01); *C09D 17/008* (2013.01)

(56) References Cited

U.S. PATENT DOCUMENTS

| | | | |
|---|---|---|---|
| 2018/0333909 A1* | 11/2018 | Arita | B29C 64/264 |
| 2019/0270901 A1* | 9/2019 | Fujii | C09D 11/38 |
| 2019/0270903 A1* | 9/2019 | Kohzuki | C11D 1/72 |
| 2020/0102466 A1 | 4/2020 | Kobayashi | |
| 2020/0231830 A1 | 7/2020 | Kobayashi et al. | |
| 2020/0231832 A1 | 7/2020 | Shimizu et al. | |
| 2020/0231833 A1 | 7/2020 | Kojima et al. | |

FOREIGN PATENT DOCUMENTS

| | | |
|---|---|---|
| JP | 2014-214230 | 11/2014 |
| JP | 2020-117585 | 8/2020 |

\* cited by examiner

ACTIVE ENERGY CURABLE WHITE INK COMPOSITION, PRINTING METHOD, PRINTING DEVICE, AND PRINTED MATTER

CROSS-REFERENCE TO RELATED APPLICATIONS

This patent application is based on and claims priority pursuant to 35 U.S.C. § 119 to Japanese Patent Application Nos. 2020-021668 and 2021-003424, filed on Feb. 12, 2020 and Jan. 13, 2021, respectively, in the Japan Patent Office, the entire disclosures of which are hereby incorporated by reference herein.

BACKGROUND

Technical Field

The present disclosure relates to an active energy curable white ink composition, a printing method, a printing device, and printed matter.

Description of the Related Art

Active energy curable ink compositions include color inks such as cyan ink, magenta ink, yellow ink, and black ink that are used for forming images, and white ink that enhances the coloring of images printed on transparent media, and clear ink that protects the surface of images and control glossiness.

White inks are required to achieve productivity in response to high speed printing, that is, curability, a high level of whiteness and concealing properties to demonstrate good coloring of color inks, and excellent dischargeability to prevent image defects caused by satellite adhesion during printing.

SUMMARY

According to embodiments of the present disclosure, an active energy curable white ink composition is provided which contains a nitrogen atom-containing monofunctional monomer (A), a nitrogen atom-free monofunctional monomer (B) having a glass transition temperature of 15 degrees or higher, a polyfunctional monomer (C), a polymerizable oligomer (D), an acylphosphine oxide-based polymerization initiator (E), and a w % bite pigment (F), wherein the proportion of (D) in the active energy curable white ink composition is 0.2% by mass or less, the proportion of (E) in the active energy curable white ink composition is from 6% to 10% by mass, and the proportion of F) in the active energy curable white ink composition is from 12% to 17% by mass.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
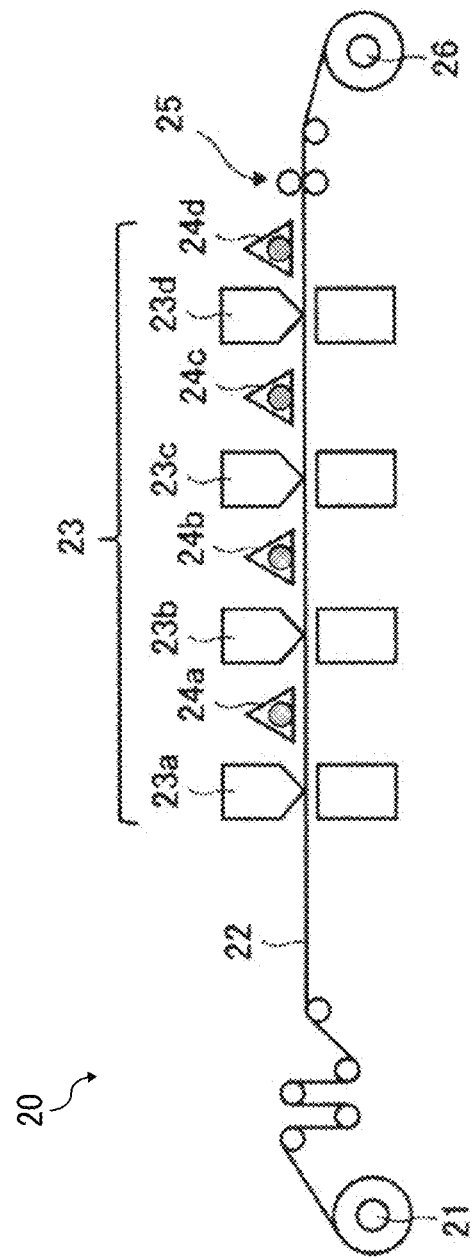
FIG. 1 is a schematic diagram illustrating an example of the image forming device according to an embodiment of the present disclosure.

The accompanying drawings are intended to depict example embodiments of the present invention and should not be interpreted to limit the scope thereof. The accompanying drawings are not to be considered as drawn to scale unless explicitly noted.

Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In an attempt to solve the trade-off between whiteness, concealing property, and curability, an active energy curable white inkjet ink composition containing a white pigment, a polymerizable monomer, an acylphosphine oxide-based initiator, and a non-acylphosphine oxide-based initiator have been proposed in JP-5663919-B1 (JP-2011-207960-A1).

In an attempt to solve drawbacks on storage stability of ink and dischargeability concerning satellite adhesion and wavelength calibration, an active energy curable ink has been proposed in JP-2014-214230-A1 which contains a dispersion containing a pigment dispersed therein using a basic resin dispersant having a urethane skeleton with excellent flowability.

An ink composition is proposed in JP-2012-140491-A1 which contains white pigment (Component A), polymerizable compound (Component B), thioxanthone compound (Component C), and acylphosphine compound (Component D), wherein the proportion of Compound C in the ink compound is from 0.03 to 0.8 percent by mass and the proportion of Compound D in the ink compound is from 1 to 15 percent by mass.

The present inventors formulated an active energy curable white ink composition containing a particular combination of a nitrogen atom-containing monofunctional monomer (A), a nitrogen atom-free monofunctional monomer (B) having a glass transition temperature of 15 degrees or higher, and a polyfunctional monomer (C) while controlling the mass ratio of a polymerizable oligomer (D), an acylphosphine oxide-based polymerization initiator (E), and a white pigment (F) and found that the white ink composition demonstrates excellent whiteness, concealing property, dischargeability, and curability.

According to the present disclosure, an active energy curable white ink composition is provided which achieves productivity in response to high speed printing, that is, curability, whiteness and concealing property not to impair the coloring of color ink, and dischargeability to prevent image defects caused by satellite adhesion during printing.

The satellite adhesion means an image defect caused by a minute droplet (satellite) not merged but separated from the main droplet, which is applied to a position shifted from the target position where the main droplet has been applied.

Active Energy Curable White Ink Composition

The active energy curable white ink composition of the present disclosure contains a nitrogen atom-containing monofunctional monomer (A), a nitrogen atom-free monofunctional monomer (B) having a glass transition temperature of 15 degrees or higher, a polyfunctional monomer (C), a polymerizable oligomer (D), an acylphosphine oxide-based polymerization initiator (E), and a white pigment (F), wherein the proportion of (D) in the active energy curable white ink composition is 0.2 percent by mass or less, the proportion of (E) in the active energy curable white ink composition is from 6 to 10 percent by mass, and the proportion of (F) in the active energy curable white ink composition is from 12 to 17 percent by mass. The active energy curable white ink composition may optionally furthermore contain other components.

Nitrogen Atom-Containing Monofunctional Monomer (A)

The nitrogen atom-containing monofunctional monomer (A) is not particularly limited and can be suitably selected to suit to a particular application. Specific examples include, but are not limited to, (meth)acryloylmorpholine, N-vinylcaprolactam, and N-vinyl(meth)acrylic amide. These can be used alone or in combination.

The curability of the active energy curable white ink composition containing a nitrogen atom-containing monofunctional monomer is enhanced because the nitrogen atom-containing monofunctional monomer (A) has a relatively high glass transition temperature (Tg).

The proportion of (A) in the total mass of the active energy curable white ink composition is preferably from 8 percent by mass or more, more preferably 10 percent by mass or more, and furthermore preferably from 10 to 20 percent by mass.

A proportion of (A) at 8 percent by mass or more enhances curability of the active energy curable white ink composition.

Nitrogen Atom-Free Monofunctional Monomer (B) Having Glass Transition Temperature of 15 Degrees or Higher The nitrogen atom-free monofunctional monomer (B) having a glass transition temperature of 15 degrees or higher is not particularly limited and can be suitably selected to suit to a particular application.

Specific examples include, but are not limited to, isobornyl(meth)acrylate (Tg=88 degrees C.), cyclic trimethylol propane formal(meth)acrylate (Tg=32 degrees C.), cyclohexyl(meth)acrylate (Tg=15 degrees C.), and 3,3,5-trimethylcyclohexanol (meth)acrylate (Tg=29 degrees C.). These can be used alone or in combination.

Although monofunctional monomers of a single component worsen the curability, ink compositions containing multiple types of monofunctional monomers have good curability when they contain the combination of (A) and (B).

The Tg of (B) means the glass transition temperature of the homopolymer of the monofunctional monomer of (B). The catalog value is adopted as the Tg if it is shown by the manufacturer of the monomer. Unless it is shown, the Tg is the temperature as measured according to the differential scanning calorimetry (DSC).

The glass transition temperature of the homopolymer of the monofunctional monomer of (B) is 15 degrees C. or higher and preferably from 30 to 100 degrees C.

The proportion of (B) having a glass transition temperature of 15 degrees or higher in the total amount of the active energy curable white ink composition is preferably from 15 to 60 percent by mass.

Other Monofunctional Monomer

Monofunctional monomers other than the monofunctional monomers mentioned above that the active energy curable white ink composition may contain are not particularly limited and can be suitably selected to suit to a particular application.

Specific examples include, but are not limited to, 2-phenoxyethyl(meth)acrylate, tetrahydro furfuryl(meth)acrylate, and 2-(2-ethoxy)ethyhl(meth)acrylate. These can be used alone or in combination.

Polyfunctional Monomer (C)

The polyfunctional monomer (C) is not particularly limited and can be suitably selected to suit to a particular application.

Specific examples include, but are not limited to, polyethylene glycol(200)di(meth)acrylate, tripropylene glycol di(meth)acrylate, dipropylene glycol di(meth)acrylate, tricyclodecane dimethanol di(meth)acrylate, and cyclohexane dimethanol di(meth)acryalte. These can be used alone or in combination.

The polyfunctional monomer (C) is expected to enhance fastness or curability by increasing the degree of cross-linking of cured ink cured matter.

The proportion of (C) in the total mass of the active energy curable white ink composition is from 5 to 15 percent by mass.

Polymerizable Oligomer (D)

The polymerizable oligomer (D) is not particularly limited and can be suitably selected to suit to a particular application.

Specific examples include, but are not limited to, CN963, CN964, CN965, and CN996 (all manufactured by Sartomer Company). It is preferable that the polymerizable oligomer preferably have an acrylate terminated structure and more preferable that the number of polymerizable reaction groups in the molecule be 2.

The proportion of the polymerizable oligomer (D) in the active energy curable white ink composition is from 0.2 percent by mass or less, preferably less than 0.1 percent by mass, more preferably from 0.01 to less than 0.1 percent by mass, and furthermore preferably from 0.01 to 0.05 percent by mass.

Polymerizable oligomers are relatively viscoelastic.

The length of ligament of a droplet of ink containing an oligomer tends to be long when the ink is discharged. Since such a long ligament may cause a printing problem such as mist, the active energy curable white ink composition of the present disclosure preferably contains polymerizable oligomer at 0.2 percent by mass or less.

Acylphosphine Oxide-Based Polymerization Initiator (E)

The acylphosphine oxide-based polymerization initiator (E) is not particularly limited and can be suitably selected to suit to a particular application. Specific examples include, but are not limited to, phenylbis(2,4,6-trimethyl benzoyl) phosphine oxide, 2,4,6-trimethyl benzoyl diphenylphosphine oxide, and bis(2,4,6-trimethyl benzoyl) phenylphosphine oxide. These can be used alone or in combination.

Specific examples of acylphosphine oxide-based polymerization initiators procurable in the market include, but are not limited to, Omnirad TPO H:2,4,6-trimethyl benzoyl) diphenylphosphine oxide (manufactured by IGM Resins B.V.) and Omnirad 819: bis(2,4,6-trimethyl benzoyl) phenylphosphine oxide (manufactured by IGM Resins B.V.).

The proportion of (E) in the total mass of the active energy curable white ink composition is from 6 to 10 percent by mass and preferably from 6 to 8 percent by mass.

The proportion of (E) of from 6 to 10 percent by mass reduces satellite adhesion and achieves sufficient curability.

The mass ratios of (B), (C), and (E) to (A) are respectively preferably from 3.0 to 6.5, from 0.5 to 1.5, and from 0.3 to 2.0 and more preferably from 2.5 to 4.0, from 0.5 to 1.2, and from 0.6 to 1.0 on a basis of (A).

The satellite adhesion of the ink can be reduced and the curability of ink can be enhanced within the ratios of (B), (C), and (E) to (A) mentioned above.

Non-Acylphosphine Oxide-Based Polymerization Initiator

The non-acylphosphine oxide-based polymerization initiator (polymerization initiator not based on acylphosphine oxide) is not particularly limited and can be suitably selected to suit to a particular application.

Specific examples include, but are not limited to, 2,4-diethyl thioxanthone-9-one and 2-isopropyl thioxanthone.

Most of the non-acylphosphine oxide-based polymerization initiator are yellowish compounds. It is preferable that the active energy curable white ink composition of the present disclosure be substantially free of non-acylphosphine oxide-based polymerization initiators because cured ink-cured matter formed of white ink containing a non-acylphosphine oxide-based polymerization initiator may become yellowish. "Substantially free" means that the proportion of the non-acylphosphine oxide-based polymerization initiator is 0.1 percent by mass or less.

White Pigment (F)

The white pigment (F) is not particularly limited and can be suitably selected to suit to a particular application.

Specific examples include, but are not limited to, titanium oxide, iron oxide, tin oxide, zirconium oxide, and iron titanium trioxide as a composite oxide. Of these, titanium oxide is preferable because it shows a high refractive index and demonstrates a high level of whiteness.

The number average primary particle diameter of the white pigment is preferably from 100 to 500 nm and more preferably from 200 to 300 nm to achieve good dispersion stability and discharging stability.

The proportion of (F) in the total mass of the active energy curable white ink composition is preferably from 12 to 17 percent by mass and more preferably from 13.5 to 15.5 percent by mass.

The proportion of (F) of from 12 to 17 percent by mass reduces satellite adhesion and achieves sufficient concealing property.

It is preferable to disperse the white pigment with a dispersant and use the white pigment in a form of a pigment dispersion.

The dispersant is not particularly limited and can be suitably selected to suit to a particular application. Polymer dispersants are preferable. Specific examples include, but are not limited to, BYK JET-9150 and BYK JET-9151 (both manufactured by BYK).

Other Components

The active energy curable white ink composition of the present disclosure may optionally contain other components. The other components are not particularly limited and can be suitably selected to suit to a particular application. Examples include, but are not limited to, polymerization inhibitors, leveling agents, defoaming agents, fluorescent brighteners, penetration-enhancing agents, wetting agents (humectants), fixing agents, viscosity stabilizers, fungicide, preservatives, antioxidants, ultraviolet absorbents, chelate agents, pH regulator, and thickeners.

Preparation of Active Energy Curable White Ink Composition

The active energy curable white ink composition of the present disclosure can be prepared by using the components described above. The preparation devices and conditions are not particularly limited.

For example, a polymerizable monomer, an organic pigment, and a dispersant are charged into and dispersed by a dispersing machine such as a ball mill, kitty mill, disk mill, pin mill, and DYNO-MILL. The obtained pigment liquid dispersion was mixed with a polymerization initiator, polymerization inhibitor, and surfactant to prepare an ink composition.

Viscosity

Viscosity of the active energy curable white ink composition of the present disclosure is not particularly limited and can be adjusted to suit to a particular application and device. For example, if a discharging device that discharges the composition from nozzles is used, the viscosity thereof is 60 mPa·s or less, preferably in the range of from 3 to 40 mPa·s, more preferably from 5 to 30 mPa·s, furthermore preferably from 5 to 15 mPa·s, and particularly preferably from 6 to 12 mPa·s in the temperature range of from 20 to 65 degrees C. preferably at 25 degrees C.

In addition, it is particularly preferable to satisfy this viscosity range without including the organic solvent mentioned above. The viscosity can be measured by a cone-and-plate type rotary viscometer (VISCOMETER TVE-22L, manufactured by TOKI SANGYO CO., LTD.) using a cone rotor (1°34'×R24) at a rate of rotation of 50 rpm with a setting of the temperature of hemathermal circulating water in the range of from 20 degrees C. to 65 degrees C. VISCOMATE VM-15011 can be used for the temperature adjustment of the circulating water.

The active energy curable white ink composition of the present disclosure preferably has a ligament length of a droplet of the ink composition of 120 μm and more preferably 100 μsec or less, and furthermore preferably 80 μsec or less as measured in the following manner.

A droplet having a ligament length of 120 μsec or less can reduce satellite adhesion.

The ligament length represents a time taken for the rear end of the ligament of a droplet of 5 to 9 pL of the active energy curable white ink composition to pass through a position 1.3 mm from the surface of a single nozzle in a discharging head after the rear end of the main portion of the droplet has passed through the position when the droplet is discharged from the single nozzle at an average discharging droplet speed of from 6.5 to 7.5 m/s at a temperature at which the active energy curable white ink composition has a viscosity of from 10.5 to 11.5 mPa·s. The ligament may or may not be separated from the main portion in the droplet.

Curing Method

One way of curing the active energy curable white ink composition of the present disclosure is applying active energy.

The active energy for use in curing the active energy curable white ink composition is not particularly limited as long as it can apply energy required to proceed the polymerization reaction of the polymerizable composition in the active energy curable white ink composition.

Specific examples include, but are not limited to, electron beams, a rays. R rays, y rays, and X rays, in addition to ultraviolet radiation. In another embodiment in which a particularly high energy light source is used, it obviates the need for a polymerization initiator to proceed polymerization reaction. In addition, mercury-free is strongly preferable in the case of ultraviolet radiation in terms of protection of the environment and it is extremely useful to replace with a GaN-based semiconductor ultraviolet light-emitting device from industrial and environmental points of view. Furthermore, ultraviolet light-emitting diodes (UV-LED) and ultraviolet laser diodes (UV-LD) are preferable as ultraviolet light sources because they are small, inexpensive, and highly efficient, and have long working life.

As for the condition for active energy radiation during printing, the irradiance is preferably from 2,000 to 3,000 mW/cm$^2$ and the cumulative irradiance is preferably from 2,000 to 3,000 mJ/cm$^2$.

Active Energy Curable Inkjet Ink Set

The active energy curable inkjet ink set for use in the present disclosure contains the active energy curable white ink composition of the present disclosure and at least one of a cyan ink composition, magenta ink composition, yellow ink composition, and black ink composition.

These cyan ink composition, magenta ink composition, yellow ink composition, and black ink composition are preferably active energy curable ink compositions.

The active energy curable inkjet ink set can enhance coloring of an image when the image is printed on transparent media.

Application Field

The application field of the active energy curable white ink composition of the present disclosure is not particularly limited. It can be applied to any field where active energy curable compositions are used. For example, the curable composition is selected suit to a particular application and used for a resin for use in molding, a paint, adhesive, insulant, releasing agent, coating material, sealing material, resists, and optical materials.

Figure 2:
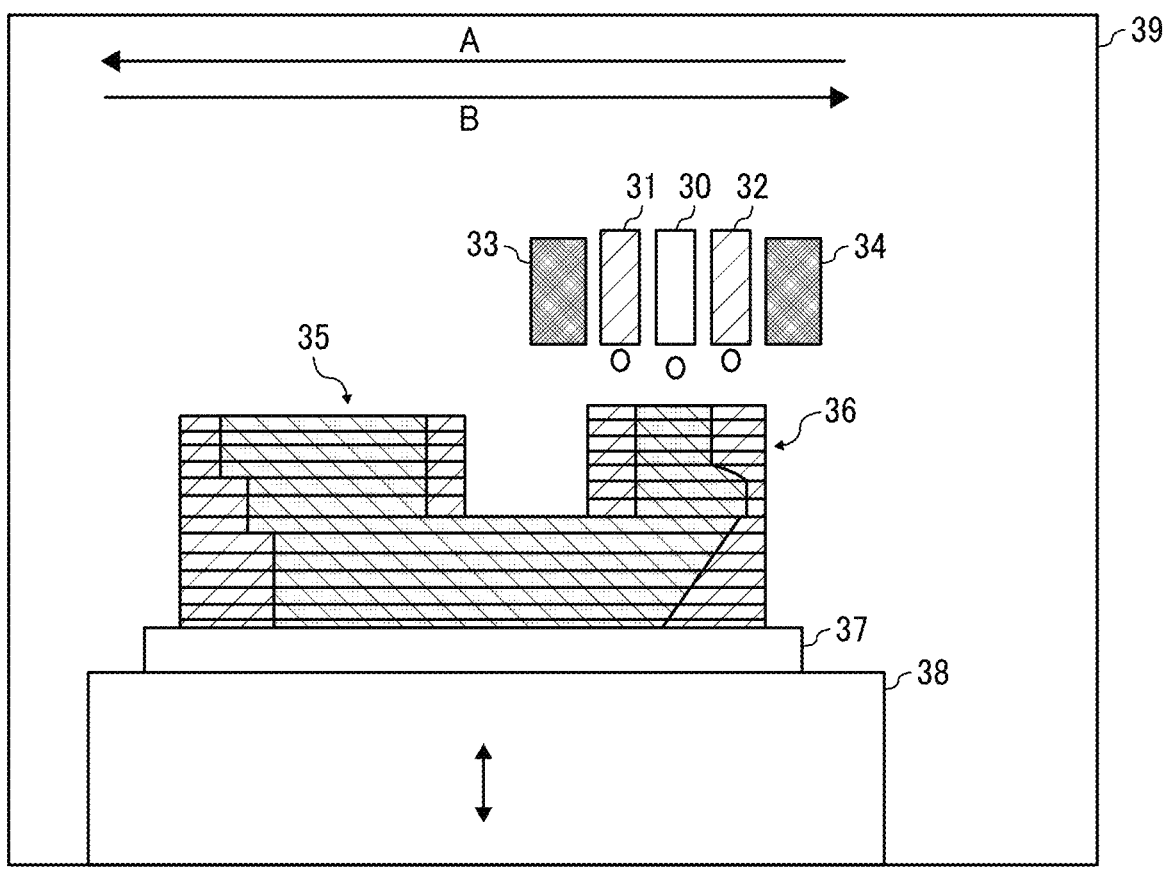
FIG. 2 is a schematic diagram illustrating another example of the image forming device according to an embodiment of the present disclosure.

Furthermore, the active energy curable white ink composition of the present disclosure can be used as an ink to form two-dimensional texts, images, and designed coating film on various substrates and in addition as a solid object forming material to form a three-dimensional object. This material for a solid freeform fabrication can be used as a binder for powder particles for use in powder additive manufacturing to conduct solid freeform fabrication by repeating curing and laminating powder layers. Also, it can be used as a solid constituting material (modeling material) or supporting member (supporting material) for use in additive manufacturing (stereolithography) method as illustrated in FIG. 2. FIG. 2 is a diagram illustrating a method of fabricating a solid freeform fabrication object by discharging the active energy curable white ink composition of the present disclosure to particular regions, exposing the ink composition on the particular region to active energy radiation to cure it, and laminating the cured layers by repeating discharging and curing the active energy curable white ink composition.

It is possible to fabricate solid freeform fabrication objects using the active energy curable white ink composition of the present disclosure with a known device without any particular limitation.

Such a device includes an accommodating unit (container), a supplying device, and a discharging device, and an active energy radiation irradiator for the curable composition.

In addition, the present disclosure includes cured matter obtained by curing the active energy curable white ink composition and a mold product obtained by processing a structure of the cured matter formed on the substrate. The cured matter or structure having a sheet-like form or film-like form is subjected to molding process such as hot drawing and punching to obtain such a processed product. The processed product is preferably used for, for example, gauges or operation panels of vehicles, office machines, electric and electronic machines, and cameras, which requires surface-processing after decorating the surface.

The substrate is not particularly limited. It can be suitably selected to suit to a particular application. Substances such as paper, fiber, threads, fabrics, leather, metal, plastic, glass, wood, ceramics, or composite materials thereof can be used. Of these, plastic substrates are preferred in terms of processability.

Composition Accommodating Container

The composition accommodating container for use in the present disclosure represents a container containing the active energy curable white ink composition and is suitable for the applications described above. For example, if the composition of the present invention is used for ink, the accommodating unit containing the ink can be used as an ink cartridge or an ink bottle. Therefore, users can avoid direct contact with the ink during working such as transfer or replacement of the ink, so that fingers and clothes are prevented from getting dirty. Furthermore, it is possible to prevent the ink from being contaminated with foreign matter such as dust. The container can be of any size, any form, and any material. For example, the container can be designed to a particular application. It is preferable that the container be made of a light blocking material to block the light or covered with materials such as a light blocking sheet.

Image Forming Method and Image Forming Device (Printing Device and Printing Device)

The printing method of the present disclosure includes discharging the active energy curable white ink composition of the present disclosure using a discharging head.

The printing device of the present disclosure includes a container containing the active energy curable white ink composition of the present disclosure and a discharging head that discharges the active energy curable white ink composition.

The printing method of the present disclosure may utilize active energy, heating, or others.

The image forming method of the present disclosure includes exposing the active energy curable white ink composition of the present disclosure to active energy radiation to cure the active energy curable white ink composition. The image forming device for forming two or three dimensional images of the present disclosure includes an irradiator to expose the active energy curable white ink composition of the present disclosure to active energy radiation and an accommodating unit containing the active energy curable white ink composition of the present disclosure. The accommodating unit may include the container mentioned above. Furthermore, the method and the device may respectively include a discharging the active energy curable white ink composition and a discharging device to discharge the active energy curable white ink composition. The method of discharging the curable composition is not particularly limited. Two ways of discharging are a continuous spraying method and an on-demand method. The on-demand method includes methods such as a piezo method, a thermal method, and an electrostatic method.

FIG. 1 is a diagram illustrating a printing device 20 including an inkjet discharging device. Printing units 23a, 23b, 23c, and 23d having ink cartridges and discharging heads for yellow, magenta, cyan, and black active energy curable inks respectively discharge the inks onto a recording medium 22 fed from a supplying roll 21. Thereafter, light sources (irradiators) 24a, 24b, 24c, and 24d emit active energy radiation to the inks to cure, thereby forming a color image. Thereafter, the recording medium 22 is conveyed to a processing unit 25 and a printed matter reeling roll 26. Each of the printing unit 23a, 23b, 23c, and 23d may include a heating assembly to liquidize the ink at the ink discharging unit. Moreover, a mechanism may be optionally disposed which cools down the recording medium 22 to an ambient temperature in a contact or non-contact manner. In addition, the inkjet recording method may be either of a serial method of discharging an ink onto a recording medium by moving the head while the recording medium intermittently moves in accordance with the width of a discharging head or a line method of discharging an ink onto a recording medium from a discharging head fixed at a particular position while continuously moving the recording medium.

It is preferable to discharge the active energy curable white ink composition at temperatures at which the curable composition has a viscosity of from 10.5 to 11.5 mPa·s.

It is preferable that the discharging head discharge droplets of from 5 to 35 pL of the active energy curable white ink composition at a discharging speed of from 6.5 to 7.5 m/s on average and preferable that the discharging head discharge droplets of from 5 to 9 pL of the active energy curable white ink composition at a discharging speed of from 6.5 to 7.5 m/s on average It is preferable to use a discharging head such as MH5420 (7 pL: single droplet)), MH5440 (7 to 35 pL, multiple droplets), MH5320 (5 pL, single droplet)), and MH5340 (5 to 15 pL, multiple droplets); these heads have high level of ink resistance, that is, they have a long working life, can discharge highly sticky ink by a built-in heater, have a good response to wavelengths, and have good productivity because the maximum amount of dischargeable droplet is large.

The recording medium 22 is not particularly limited.

Specific examples include, but are not limited to, paper, film, ceramics, glass, metal, or complex materials thereof. The recording medium 22 may take a sheet-like form. The image forming device may have a simplex printing configuration capable of printing on one side of a recording medium or a duplex printing configuration capable of printing on both sides thereof. The recording medium is not limited to a typical recording medium. It is suitable to use corrugated cardboard, building materials such as wall paper and floor material, cloth for apparel such as T-shirts, textile, and leather as the recording media. The present disclosure is particularly good for transparent media because it has a large impact on reducing satellite adhesion and enhancing concealing property.

Optionally, it is possible to print an image with multiple colors with no or faint active energy from the light sources 24a. 24b, and 24c and thereafter expose the image to the active energy radiation from the light source 24d. This configuration saves energy and cost.

The recorded matter having images printed with the active energy curable white ink composition of the present disclosure includes items having printed text or images on a plain surface of a medium such as conventional paper and resin film, items having printed text or images on a rough surface, and items having printed text or images on a surface made of various materials such as metal or ceramic. In addition, it is possible to form an image partially with solid feeling (formed of two dimensional images and three dimensional images) or a solid object by laminating two dimensional images.

FIG. 2 is a schematic diagram illustrating another example of the image forming device (printing device) (device for fabricating a three-dimensional image) of the present disclosure. An image forming device 39 illustrated in FIG. 2 stacks layers by: discharging the first active energy curable white ink composition from a discharging head unit 30 for fabrication and a second active energy curable white ink composition composed of different ingredients from the first active energy curable white ink composition from discharging head units 31 and 32 for a support by using a head unit having inkjet heads disposed movable in the directions indicated by the arrows A and B; curing each composition with ultraviolet irradiators 33 and 34 disposed adjacent to the discharging head units 31 and 32; and repeating the discharging and the curing processes. More specifically, for example, after the discharging head units 31 and 32 for a support discharge the second active energy curable white ink composition onto a substrate 37 for fabrication, the second active energy curable white ink composition is solidified at exposure to active energy radiation to form a first support layer having a hollow space (pool) for fabrication, and the discharging head unit 30 for fabrication discharges the first active energy curable white ink composition onto the hollow space followed by exposure to active energy radiation for solidification, thereby to form a first fabrication layer. This step is repeated multiple times in accordance with the required number of lamination while moving the stage 38 up and down in the vertical direction to laminate the support layer and the fabrication layer to manufacture a solid freeform fabrication object 35. Thereafter, a laminated support 36 is removed, if desired. Although there is only one of the discharging head unit 30 for fabrication illustrated in FIG. 2, the device may have two or more discharging head units 30.

Printed Matter

The printed matter of the present disclosure is printed using the active energy curable white ink composition of the present disclosure.

The printed matter has cured matter of the active energy curable white ink composition of the present disclosure on a recording medium.

Terms such as image forming, recording, printing, and print used in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Preparation of White Pigment Dispersion

Preparation of White Pigment Dispersion a

A white pigment dispersion A was prepared by dispersing a mixture of a white pigment (JR301, number average primary particle diameter of 300 nm, manufactured by TAYCA CORPORATION) at 50 percent, a dispersion medium (phenoxyethylacrylate (PEA), manufactured by OSAKA ORGANIC CHEMICAL INDUSTRY LTD.) at 45 percent by mass, and a dispersant (BYK JET-9151, manufactured by BYK) at 5 percent by mass a bead mill dispersing machine using zirconia beads.

Examples 1 to 14 and Comparative Examples 1 to 10

Manufacturing of White Ink

According to the ink compositions shown in Tables 1 to 5, each raw material was mixed using a three-one motor to obtain an ink mixture. Thereafter, white inks of Examples 1 to 14 and Comparative 1 to 10 were obtained by filtering the ink mixtures using a capsule filter having an absolute filtering accuracy of 1.0 μm and filling the filtered material in a clean bottle.

Properties of the obtained white inks were evaluated in the following manner. The results are shown in Tables 1 to 5.

Ligament Length of Discharged Droplet

The inks were subjected to the following discharging test using a printer (EV2500, manufactured by Ricoh Co., Ltd.) with a discharging head (MH5420, manufactured by Ricoh Co., Ltd.) MH5420 can be replaced with MH5440, MH5320, and MH5340 (all manufactured by Ricoh Co., Ltd.).

Droplets of each white ink of 5 to 9 pL were discharged at an average droplet speed of from 6.5 to 7.5 m/s at temperatures at which the viscosity of the white inks was from 10.5 to 11.5 mPa·s while a single nozzle of the discharging head was driven to operate. The time when the rear end of the main portion of the ink droplet discharged passed through the position 1.3 mm from the nozzle surface was defined as 0 μsec. The ligament length of the ink droplet defined as the time taken for the rear end of the ligament at the rear of the main droplet of the ink to pass through the position 1.3 mm was used to evaluate dischargeability according to the following evaluation criteria. B and higher grades are allowable for practical purpose.

Evaluation Criteria

S: 80 μsec
A: more than 80 μsec to 100 μsec
B: more than 100 μsec to 120 μsec
C: More than 120 μsec Curability A polyethylene (PET) film having a smooth surface was used as the non-permeating substrate.

Each white ink was applied to the surface of the PET film using a bar coater to obtain a dry film having a thickness of from 8 to 12 μm.

The white ink layer on the PET film prepared as described above was irradiated with arbitrary cumulative irradiance by adjusting the irradiation time at an irradiance of from 900 to 1,100 mW/cm² using an LED having a center wavelength of 395 nm as the light source.

The surface of the ink layer was touched with a finger 10 seconds after the irradiation by the LED. The value of cumulative irradiance below which the finger felt sticky was defined as the measuring value of curability and evaluated according to the following criteria. B and higher grades are allowable for practical purpose.

Evaluation Criteria

A: 1,000 mJ/cm² or less
B: more than 1,000 to 1.500 mJ/cm²
A: more than 1,500 mJ/cm²

Whiteness

An image was printed on a transparent substrate (Lupilon® NF2000, manufactured by MITSUBISHI GAS CHEMICAL COMPANY, INC.) at a resolution of 600 dpi×1,200 dpi to attach each white ink to the surface of the substrate in an amount of from 1.6 to 1.8 mg/cm².

The active energy required during printing was that irradiance was from 2,000 to 3,000 mW/cm² and the cumulative irradiance was from 2,000 to 3.000 mi/cm².

a* and b* of each printed matter were measured using X Rite exact (manufactured by X-Rite Inc.). Saturation c* was calculated according to the relationship: $c^* = \{(a^*)+(b^*)^2\}^{1/2}$ measured, and evaluated according to the following criteria. B and higher grades are allowable for practical purpose.

Evaluation Criteria

A: c* is 1.5 or less
B: c* is greater than 1.5 and not greater than 3.0
C: c* is greater than 3.0

Concealing Property

An image was printed on a transparent substrate (Lupilon® NF2000, manufactured by MITSUBISHI GAS CHEMICAL COMPANY, INC.) at a resolution of 600 dpi×1,200 dpi to attach each white ink to the surface of the substrate in an amount of from 4.5 to 4.7 mg/cm$^2$.

Using the printed white ink image and black paper, black transmission density was measured with X-Rite 939 (manufactured by X-Rite Inc.) and evaluated according to the following criteria, B and higher grades are allowable for practical purpose.

Evaluation Criteria

S: Black transmission density was 0.10 or less
A: Black transmission density was greater than 0.10 to 0.13
B: Black transmission density was greater than 0.13 to 0.15
C: Black transmission density was over 0.15

TABLE 1

| | | Example | | | | | |
|---|---|---|---|---|---|---|---|
| | | 1 | 2 | 3 | 4 | 5 | 6 |
| Nitrogen atom-containing monofunctional monomer (A) | ACMO | 8 | | 8 | | 8 | |
| | NVC | | 8 | | 8 | | 8 |
| Nitrogen atom-free monofunctional monomer (B) having glass transition temperature of 15 degrees or higher | IBXA | 5 | 15 | 10 | 10 | 10 | 10 |
| | CHA | 5 | 15 | | 5 | | 5 |
| | CTFA | 5 | 20 | 15 | 15 | 15 | 15 |
| Other monofunctional monomer | THEA | | | | 10 | | 10 |
| | PEA | 20.3 | 3.3 | 24.3 | 9.3 | 28.3 | 7.3 |
| Polyfunctional monomer (C) | DPGDA | 12 | | 8 | | 6 | |
| | TPGDA | | 8 | | 10 | | 10 |
| Polymerizable oligomer (D) | CN963 | 0.2 | 0.2 | 0.2 | 0.2 | 0.2 | 0.2 |
| Acylphosphine oxide-based polymerization initiator (E) | Omnirad TPO | | 6 | 10 | | | 10 |
| | Ominrad 819 | 10 | | | 8 | 8 | |
| Non-acylphosphine oxide-based polymerization initiator | ITX | | 0.5 | | | 0.5 | |
| | DETX | 0.5 | | 0.5 | 0.5 | | 0.5 |
| Pigment dispersion | White pigment dispersion A | 34 | 24 | 24 | 24 | 24 | 24 |
| Ink composition data | Pigment solid content (F) (percent by mass) | 17 | 12 | 12 | 12 | 12 | 12 |

TABLE 1-continued

| | | Example | | | | | |
|---|---|---|---|---|---|---|---|
| | | 1 | 2 | 3 | 4 | 5 | 6 |
| | Proportion of (B) in (A) (percent by mass) | 1.9 | 6.3 | 3.1 | 3.8 | 3.1 | 3.8 |
| | Proportion of (C) in (A) (percent by mass) | 1.5 | 1.0 | 1.0 | 1.3 | 0.8 | 1.3 |
| | Proportion of (E) in (A) (percent by mass) | 1.3 | 0.8 | 1.3 | 11.0 | 1.0 | 1.3 |
| Evaluation result | Ligament length | A | S | A | S | S | A |
| | Curability | B | A | A | A | A | A |
| | Degree of whiteness | B | B | B | B | B | B |
| | Concealing ability | A | B | B | B | A | B |

TABLE 2

| | | Example | | | | | |
|---|---|---|---|---|---|---|---|
| | | 7 | 8 | 9 | 10 | 11 | 12 |
| Nitrogen atom-containing monofunctional monomer (A) | ACMO | 8 | | 8 | | 8 | 15 |
| | NVC | | 8 | | 8 | | |
| Nitrogen atom-free monofunctional monomer (B) having glass transition temperature of 15 degrees or higher | IBXA | 10 | 10 | 10 | 10 | 10 | 10 |
| | CHA | | | 5 | | 5 | 5 |
| | CTFA | 15 | 15 | 15 | 15 | 15 | 5 |
| Other monofunctional monomer | THFA | | 10 | | 10 | | 10 |
| | PEA | 30.3 | 6.3 | 16.3 | 4.8 | 9.5 | 0.3 |
| Polyfunctional monomer (C) | DPGDA | 6 | 8 | 8 | | 8 | |
| | TPGDA | | | | 8 | | 10 |
| Polymerizable oligomer (D) | CN963 | 0.2 | 0.2 | 0.2 | 0.2 | | 0.2 |
| Acylphosphine oxide-based polymerization initiator (E) | Omnirad TPO | 6 | 8 | | 10 | | 10 |
| | Ominrad 819 | | | 10 | | 10 | |
| Non-acylphosphine oxide-based polymerization initiator | ITX | | 0.5 | | | 0.5 | |
| | DETX | 0.5 | | 0.5 | | | 0.5 |
| Pigment dispersion | White pigment dispersion A | 24 | 34 | 27 | 34 | 34 | 34 |
| Ink composition data | Pigment solid content (F) (percent by mass) | 12 | 17 | 13.5 | 17 | 17 | 17 |
| | Proportion of (B) in (A) (percent by mass) | 3.1 | 3.1 | 3.8 | 3.1 | 3.8 | 1.3 |
| | Proportion of (C) in (A) (percent by mass) | 0.8 | 1.0 | 1.0 | 1.0 | 1.0 | 0.7 |
| | Proportion of (E) in (A) | 0.8 | 1.0 | 1.3 | 1.3 | 1.3 | 0.7 |

TABLE 2-continued

|  |  | Example | | | | | |
|---|---|---|---|---|---|---|---|
|  |  | 7 | 8 | 9 | 10 | 11 | 12 |
|  | (percent by mass) | | | | | | |
| Evaluation result | Ligament length | S | S | S | A | S | A |
|  | Curability | A | A | A | A | A | S |
|  | Degree of whiteness | B | B | B | A | B | B |
|  | Concealing property | A | A | A | A | A | A |

TABLE 3

|  |  | Example | |
|---|---|---|---|
|  |  | 13 | 14 |
| Nitrogen atom-containing monofunctional monomer (A) | ACMO | 8 | 10 |
|  | NVC | | |
| Nitrogen atom-free monofunctional monomer (B) having glass transition temperature of 15 degrees or higher | IBXA | 10 | 10 |
|  | CHA | 5 | 5 |
|  | CTFA | 15 | 5 |
| Other monofunctional monomer | THFA | | 10 |
|  | PEA | 12.3 | 5.3 |
| Polyfunctional monomer (C) | DPGDA | 8 | |
|  | TPGDA | | 10 |
| Polymerizable oligomer (D) | CN963 | 0.2 | 0.2 |
| Acylphosphine oxide-based polymerization initiator (E) | Omnirad TPO | | 10 |
|  | Ominrad 819 | 10 | |
| Non-acylphosphine oxide-based polymerization initiator | ITX | | |
|  | DETX | 0.5 | 0.5 |
| Pigment dispersion | White pigment dispersion A | 31 | 34 |
| Ink composition data | Pigment solid content (F) (percent by mass) | 15.5 | 17 |
|  | Proportion of (B) in (A) (percent by mass) | 3.8 | 2.0 |
|  | Proportion of (C) in (A) (percent by mass) | 1.0 | 1.0 |
|  | Proportion of (E) in (A) (percent by mass) | 1.3 | 1.0 |
| Evaluation result | Ligament length | S | A |
|  | Curability | A | S |
|  | Degree of whiteness | B | B |
|  | Concealing property | A | A |

TABLE 4

|  |  | Comparative Example | | | | | |
|---|---|---|---|---|---|---|---|
|  |  | 1 | 2 | 3 | 4 | 5 | 6 |
| Nitrogen atom-containing monofunctional monomer (A) | ACMO | | 8 | 8 | | | 31.3 |
|  | NVC | 8 | | | 8 | | |
| Nitrogen atom-free monofunctional monomer (B) having glass transition temperature of 15 degrees or higher | IBXA | 10 | 10 | 10 | 10 | 10 | |
|  | CHA | | 5 | | 5 | 5 | |
|  | CTFA | 15 | 15 | 15 | 15 | 15 | |
| Other monofunctional monomer | THFA | | 10 | | 10 | | 10 |
|  | PEA | 12.3 | 4.3 | 10.3 | 17.3 | 21.3 | 10 |
| Polyfunctional monomer (C) | DPGDA | 8 | | 8 | 8 | | 8 |
|  | TPGDA | | 8 | | | 8 | |
| Polymerizable oligomer (D) | CN963 | 0.2 | 0.2 | 0.2 | 0.2 | 0.2 | 0.2 |
| Acylphosphine oxide-based polymerization initiator (E) | Omnirad TPO | 12 | 5 | 10 | | | 6 |
|  | Ominrad 819 | | | | 10 | | 6 |
| Non-acylphosphine oxide-based polymerization initiator | ITX | 0.5 | | 0.5 | | 0.5 | |
|  | DETX | | 0.5 | | 0.5 | | 0.5 |
| Pigment dispersion | White pigment dispersion A | 34 | 34 | 38 | 16 | 34 | 34 |
| Ink composition data | Pigment solid content (F) (percent by mass) | 17 | 17 | 19 | 8 | 17 | 17 |
|  | Proportion of (B) in (A) (percent by mass) | 3.1 | 3.8 | 3.1 | 3.8 | — | — |
|  | Proportion of (C) in (A) (percent by mass) | 1.0 | 1.0 | 1.0 | 1.0 | — | 0.3 |
|  | Proportion of (E) in (A) (percent by mass) | 1.5 | 0.6 | 1.3 | 1.3 | — | 0.2 |
| Evaluation result | Ligament length | C | S | C | C | A | A |
|  | Curability | A | C | A | A | C | C |
|  | Degree of whiteness | B | B | B | B | B | B |
|  | Concealing property | A | A | S | C | A | A |

TABLE 5

|  |  | Comparative Example | | | |
|---|---|---|---|---|---|
|  |  | 7 | 8 | 9 | 10 |
| Nitrogen atom-containing monofunctional monomer (A) | ACMO | | 8 | | 8 |
|  | NVC | 8 | | 8 | |
| Nitrogen atom-free monofunctional | IBXA | 10 | 10 | 10 | 5 |
|  | CHA | 5 | 5 | 5 | 5 |
|  | CTFA | 15 | 15 | 15 | 5 |

TABLE 5-continued

| | | Comparative Example | | | |
|---|---|---|---|---|---|
| | | 7 | 8 | 9 | 10 |
| monomer (B) having glass transition temperature of 15 degrees or higher | | | | | |
| Other monofunctional monomer | THFA | | 10 | 10 | |
| | PEA | 21.3 | 9.3 | 11.3 | 20.3 |
| Polyfunctional monomer (C) | DPGDA | | | 8 | 12 |
| | TPGDA | | 8 | | |
| Polymerizable oligomer (D) | CN963 | 0.2 | 0.2 | 0.2 | 0.3 |
| Acylphosphine oxide-based polymerization initiator (E) | Omnirad TPO | 6 | | | 10 |
| | Ominrad 819 | | | 10 | |
| Non-acylphosphine oxide-based polymerization initiator | ITX | 0.5 | | | |
| | DETX | | 0.5 | 0.5 | 0.5 |
| Pigment dispersion | White pigment dispersion A | 34 | 34 | 22 | 34 |
| Ink composition data | Pigment solid content (F) (percent by mass) | 17 | 17 | 11 | 17 |
| | Proportion of (B) in (A) (percent by mass) | 3.8 | 3.8 | 3.8 | 1.9 |
| | Proportion of (C) in (A) (percent by mass) | — | 1.0 | 1.0 | 1.5 |
| | Proportion of (E) in (A) (percent by mass) | 0.8 | — | 1.3 | 1.3 |
| Evaluation result | Ligament length | A | S | C | C |
| | Curability | C | C | A | B |
| | Degree of whiteness | B | — | B | B |
| | Concealing property | A | — | B | A |

*"—" for degree of whiteness and concealing property of Comparative Example 8 shown in Table 5 means they were not measurable.

The details of the individual ingredients in Tables 1 to 5 are as follows:

Nitrogen Atom-Containing Monofunctional Monomer (A)

Acryloylmorpholine: manufactured by KJ Chemicals Corporation
N-Vinylcaprolactam (manufactured by Tokyo Chemical Industry Co., Ltd.)

Nitrogen Atom-Free Monofunctional Monomer (B) Having Glass Transition Temperature of 15 Degrees or Higher IBXA: Isobornyl acrylate (Tg=88 degrees C., manufactured by OSAKA ORGANIC CHEMICAL INDUSTRY LTD.)
CHA: Cyclohexyl acrylate (Tg=15 degrees C., manufactured by OSAKA ORGANIC CHEMICAL INDUSTRY LTD.)
CTFA: Cyclic trimethylol propane formal acrylate (Tg=32 degrees C., manufactured by OSAKA ORGANIC CHEMICAL INDUSTRY LTD.)

Measuring of Glass Transition Temperature

Nitrogen atom-free monofunctional polymerizable monomer (B) was polymerized by a typical solution polymerization method.
a: Toluene solution of nitrogen atom-free monofunctional polymerizable monomer (B) at 10 percent by mass
b: Initiator: Azobis isobutyl nitrile (5 percent by mass)
a and b was purged of nitrogen and sealed in a test tube. The test tube was bathed in hot water at 60 degrees C. for six hours to prepare a polymer.
Thereafter, the polymer was re-precipitated in a solution such as methanol and petroleum ether in which the nitrogen atom-free monofunctional polymerizable monomer was soluble and the polymers were insoluble followed by filtering to obtain the polymer.
The obtained polymer was subjected to DSC measuring. The DSC instrument used was DSC 120U, manufactured by Seiko Instruments. The range of the measuring temperature was from 30 to 300 degrees C. and the temperature rising speed was 2.5 degrees C. per minute.

Other Monofunctional Monomer

THFA (Tetrahydrofurfuryl acrylate) (manufactured by OSAKA ORGANIC CHEMICAL INDUSTRY LTD.)
PEA: 2-phenoxyethyl acrylate (manufactured by OSAKA ORGANIC CHEMICAL INDUSTRY LTD.)

Polyfunctional Monomer (C)

DPGDA: Dipropylene glycol diacrylate, manufactured by Sartomer Company
TPGDA: Tripropylene glycol diacrylate, manufactured by Sartomer Company Polymerizable Oligomer (D)

CN963: polyester-based acrylate oligomer, manufactured by Sartomer Company

Acylphosphine Oxide-Based Polymerization Initiator (E)

Omnirad TPO H: 2,4,6-trimethyl benzoyl-diphenylphosphine oxide, manufactured by IGM Resins B.V.
Ominrad 819; Bis(2,4,6-trimethyl benzoyl)phenylphosphine oxide, manufactured by IGM Resins B.V.

Non-Acylphosphine Oxide-Based Polymerization Initiator

ITX: 2-isopropyl thioxanthone, manufactured by IGM Resins B.V.
DETX: 2,4-diethyl thioxanthene-9-one, manufactured by IGM Resins B.V.

The aspects of the present disclosure are, for example, as follows:
1. An active energy curable white ink composition contains a nitrogen atom-containing mono-functional monomer (A), a nitrogen atom-free mono-functional monomer (B) having a glass transition temperature of 15 degrees or higher, a polyfunctional monomer (C), a polymerizable oligomer (D), an acylphosphine oxide-based polymerization initiator (E), and a white pigment (F), wherein the proportion of (D) in the active energy curable white ink composition is 0.2% by mass or less, wherein a proportion of (E) in the active energy curable white ink composition is from 6 to 10 percent by mass and the proportion of (F) in the active energy curable white ink composition is from 12% to 17% by mass.

2. The active energy curable white ink composition according to 1 mentioned above, wherein the mass ratios of (B), (C), and (E) to (A) are respectively from 3.0 to 6.5, from 0.5 to 1.5, and 0.3 to 2.0 on a basis of (A).

3. The active energy curable white ink composition according to 1 or 2 mentioned above, wherein the proportion of (E) in the active energy curable white ink composition is from 6 to 8 percent by mass, 4. The active energy ray curable composition according to any one of 1 to 3, wherein the proportion of (F) in the active energy curable white ink composition is from 13.5% to 15.5% by mass.

5. The active energy curable white ink composition according to any one of 1 to 4, wherein the active energy curable white ink composition is free of non-acylphosphine oxide-based polymerization initiator.

6. The active energy curable white ink composition curable composition according to 1 or 5 mentioned above, wherein the proportion of (D) in the active energy curable white ink composition is less than 0.1% by mass, 7. The active energy curable white ink composition according to any one of 1 to 6 mentioned above, wherein the proportion of (A) in the active energy curable white ink composition is 10 percent by mass or more, 8. The active energy curable white ink composition according to any one of 1 to 7 mentioned above, wherein a droplet of the active energy curable white ink composition has a ligament length of 120 μsec or less, where the ligament length represents a time taken for the rear end of the ligament of a droplet having a volume of from 5 to 9 pL of the active energy curable white ink composition to pass through a position 1.3 mm from the surface of a single nozzle in a discharging head after the rear end of the main portion of the droplet has passed through the position when the droplet is discharged from the single nozzle at an average discharging droplet speed of from 6.5 to 7.5 m/s at a temperature at which the active energy curable white ink composition has a viscosity of from 10.5 to 11.5 mPa·s. The ligament may or may not be separated from the main portion in the droplet.

9. A printing method includes discharging the active energy curable white ink composition of any one of 1 to 8 mentioned above with a discharging head.

10. The printing method according to 9 mentioned above, wherein the discharging includes discharging droplets each having a volume of from 5 to 9 pL of the active energy curable white ink composition at an average droplet speed of from 6.5 to 7.5 m/s at a temperature at which the active energy curable white ink composition has a viscosity of from 10.5 to 11.5 mPa·s.

11. A printing device includes a container containing the active energy curable white ink composition of any one of 1 to 8 mentioned above and
a discharging head configured to discharge the active energy curable white ink composition.

12. Printed matter includes a substrate and the active energy curable white ink composition of any one of 1 to 8 mentioned above on the substrate.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An active energy curable white ink composition comprising:
a nitrogen atom-containing monofunctional monomer (A);
a nitrogen atom-free monofunctional monomer (B) having a glass transition temperature of 15 degrees or higher;
a polyfunctional monomer (C);
a polymerizable oligomer (D);
an acylphosphine oxide-based polymerization initiator (E); and
a white pigment (F),
wherein a proportion of (D) in the active energy curable white ink composition is 0.2% by mass or less,
wherein a proportion of (E) in the active energy curable white ink composition is from 6% to 10% by mass,
wherein a proportion of (F) in the active energy curable white ink composition is from 12% to 17% by mass.

2. The active energy curable white ink composition according to claim 1, wherein mass ratios of (B), (C), and (E) to (A) are respectively from 3.0 to 6.5, from 0.5 to 1.5, and 0.3 to 2.0 on a basis of (A).

3. The active energy curable white ink composition according to claim 1, wherein the proportion of (E) in the active energy curable white ink composition is from 6% to 8% by mass.

4. The active energy curable white ink composition according to claim 1, wherein the proportion of (F) in the active energy curable white ink composition is from 13.5% to 15.5% by mass.

5. The active energy curable white ink composition according to claim 1, being substantially free of non-acylphosphine oxide-based polymerization initiator.

6. The active energy curable white ink composition according to claim 1, wherein the proportion of (D) in the active energy curable white ink composition is less than 0.10% by mass.

7. The active energy curable white ink composition according to claim 1, wherein a proportion of (A) in the active energy curable white ink composition is 10% by mass or more.

8. The active energy curable white ink composition according to claim 1, wherein a droplet of the active energy curable white ink composition has a ligament length of 120 μsec, where the ligament length means a time taken for a rear end of a ligament of a droplet having a volume of from 5 to 9 pL of the active energy curable white ink composition to pass through a position 1.3 mm from a surface of a single nozzle in a discharging head after a rear end of a main portion of the droplet has passed through the position when the droplet is discharged from the single nozzle at an average discharging droplet speed of from 6.5 to 7.5 m/s at a temperature at which the active energy curable white ink composition has a viscosity of from 10.5 to 11.5 mPa·s.

9. A printing method comprising:
discharging the active energy curable white ink composition of claim 1 with a discharging head.

10. The printing method according to claim 9, wherein the discharging includes discharging droplets each having a volume of from 5 to 9 pL of the active energy curable white ink composition at an average droplet speed of from 6.5 to 7.5 m/s at a temperature at which the active energy curable white ink composition has a viscosity of from 10.5 to 11.5 mPa·s.

11. A printing device comprising:
    a container containing the active energy curable white ink composition of claim 1; and
    a discharging head configured to discharge the active energy curable white ink composition.

12. Printed matter comprising:
    a substrate; and
    the active energy curable white ink composition of claim 1 on the substrate.

* * * * *